2,937,181
Patented May 17, 1960

2,937,181

NEW INDENOTHIAZOLE

George de Stevens, Portland, and Robert H. Sprague, East Hampton, Conn., assignors to Sperry Rand Corporation, New York, N.Y., a corporation of Delaware No Drawing. Original application August 22, 1955, Serial No. 529,965, now Patent No. 2,912,434, dated November 10, 1959. Divided and this application November 21, 1958, Serial No. 777,170

6 Claims. (Cl. 260—302)

This invention relates to a new composition of matter. More particularly it relates to (2,1d)indenothiazole and 2-methyl-(2,1d)indenothiazole and to a process for preparing same.

This application is a division of the co-pending application of George de Stevens et al., Serial Number 529,965, filed August 22, 1955, now Patent No. 2,912,- 434, for Preparation of Indenothiazoles and Cyanine Dyes Therefrom.

It has been found that the new thiazole compound of this invention has many useful properties. For example, it is possible to prepare cyanine dyes therefrom which are capable of sensitizing photographic emulsions strongly and cleanly, i.e. without the production of excessive fog or residual dye stain.

It is known that cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain. With the indenothiazole compound of this invention, it is possible to prepare cyanine dyes in which one or both of the aforesaid auxochromic nitrogen atoms lie in a (2,1d)indenothiazole nucleus.

Accordingly, it is the primary object of the present invention to provide the new indenothiazole compounds (2,1d)indenothiazole (I) and 2-methyl-(2,1d)indenothiazole (II) having the following formulas

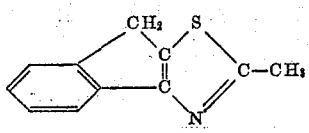

II

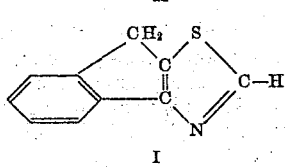

I

Also in accordance with this invention there is provided a process for preparing (2,1d)indenothiazole and 2-methyl-(2,1d)indenothiazole by condensing 2-bromoindanone with thioformamide and thioacetamide respectively.

For a better understanding of the invention, together with other and further objects thereof, reference is had to the following description and its scope will be pointed out in the appended claims.

The following examples will serve to demonstrate the manner of preparation of my new thiazole and quaternary salts thereof. These examples are not intended, however, to limit my invention.

Example I.—2-methyl-(2,1d)indenothiazole

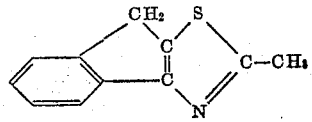

106 g. (0.5 mole) of 2-bromoindanone (Wilds, J.A.C.S. 68, 86 (1946)), was dissolved in 250 cc. of abs. $C_2H_5OH$. To this solution there was added 37.5 g. (0.5 mole) of thioacetamide. The mixture was heated on the steam bath for 1½ hours. The alcohol was then removed at reduced pressure. Five percent aqueous hydrobromic acid solution (200 cc.) was added to the residue. This heterogeneous mixture was extracted thoroughly with ether. After separation of the ether, the aqueous HBr mixture was made alkaline with ammonium hydroxide, extracted with ether, dried over $K_2CO_3$, and the ether was removed. The solid residue was distilled at reduced pressure collecting the fraction coming over at 147°–150°/12.8 mm., which solidified on cooling. This base was obtained in 25% yield.

Example II.—(2,1d)indenothiazole

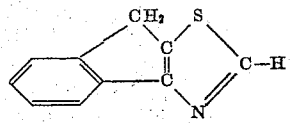

To 21 g. (0.1 mole) of 2-bromoindanone there was added 35 cc. of abs. $C_2H_5OH$ and 7 g. (0.1 mole) of thioformamide. The mixture was heated on the steam bath. Within a short time a vigorous reaction occurred with the precipitation of much white solid. The mixture was heated on the steam bath for 1 hour. The alcohol was then removed at reduced pressure. The viscous red material was dissolved in 200 cc of 10% aqueous HBr solution (much tar remained undissolved). The acid solution was extracted thoroughly with ether. The acid solution was then made alkaline with ammonium hydroxide whereupon a red oil separated out. This basic mixture was extracted with ether and the ether extract dried over $K_2CO_3$. After removal of the ether, the residue was distilled at reduced pressure. No forerun was obtained. The product was collected at 180°–184°/24 mm. in 23% yield.

Example III.—2-methyl-(2,1d)indenothiazole ethiodide

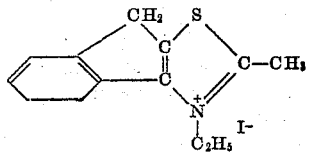

10.0 g. (0.05 mole) of 2-methyl-(2,1d)indenothiazole and 9.5 g. (0.05 mole 10% excess) of ethyl iodide were heated at reflux on a steam bath for 8 hours. After chilling, the precipitate was collected at the pump, washed well with ether then acetone and air dried. The yield of acetone-recrystallized-quaternary salt, M.P. 233°–235° d., was 70% of theoretical.

Example IV.—2-methyl-(2,1d)indenothiazole ethoperchlorate

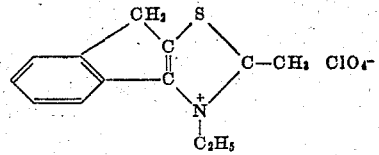

To 0.1 g. of 2-methyl-(2,1d)indenothiazole ethiodide dissolved in 5 cc. of methanol there was added 15 cc. of methanol containing 0.2 g. of sodium perchlorate. The solution was chilled at 0° overnight. The crystals were collected on a filter and washed with a small amount of cold methanol. After drying in vacuo the crystals melted at 218° C.

Analysis.—Calc'd. for $C_{13}H_{14}ClNO_4S$: N, 4.438%; S, 10.16%. Found: N, 4.43%; S, 10.13%.

Example V.—(2,1d)indenothiazole ethiodide

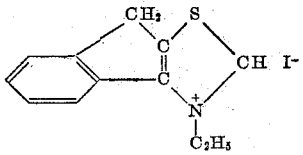

2.3 g. (0.015 mole) of (2,1d)indenothiazole and 3.0 g. (0.015 mole 20% excess) of ethyl iodide were refluxed for 6 hours. On chilling, the precipitate was washed well with ether, then acetone and dried in vacuo. The yield of crude quaternary salt, melting at 209°–211° C. was 67% of theoretical. 0.5 g. of crude salt was recrystallized from 45 cc. of acetone containing Norite to give an analytically pure sample.

Analysis.—Calc'd. for $C_{12}H_{12}INS$: N, 9.74%. Found: N, 9.68%.

As starting material for the preparation of novel cyanine dyes, (2,1d)indenothiazole or 2-methyl-(2,1d)indenothiazole is first converted to a quaternary salt by reacting it with an ester such as ethyl iodide set forth hereinabove in Examples III and V. Other examples of esters are other alkyl halides, alkyl sulfates, alkyl-p-toluene sulfonates, etc. For purposes of convenience, the quaternary salts useful in preparing the new cyanine dyes can be represented by the single formula

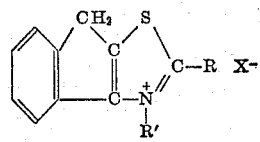

where R' represents an alkyl group such as methyl, ethyl, n-propyl, isobutyl, β-hydroxyethyl, β-methoxyethyl, β-ethoxyethyl, β-acetoxyethyl, β-carboxyethyl, carboxymethyl, β-carbomethoxyethyl, β-carbethoxyethyl alkyl, etc., or an aralkyl group such as benzyl, phenyl, etc., R represents methyl or hydrogen and X⁻ represents an anion, e.g., chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts, they are reacted with 2-halogenoquinoline quaternary salts in the presence of an acid binding agent such as sodium ethylate, sodium carbonate, pyridine or a strong organic base such as triethylamine, trimethylamine and N-methylpiperidine. In this connection, it has been found advantageous to employ a mixture of pyridine with a strong tertiary organic base.

Instead of 2-halogenoquinoline quaternary salts, there can be employed 2-alkylmercapto or 2-arylmercaptoquinoline quaternary salts to condense with the quaternary salts of the (2,1d)indenothiazole or 2-methyl-(2,1d)indenothiazole in the presence of an acid binding agent.

Using 2-halogenopyridine quaternary salts instead of 2-halogenoquinoline quaternary salts, there can be prepared pyrido-cyanine dyes containing a (2,1d)indenothiazole nucleus.

Using 2-alkyl mercapto or 2-aryl mercapto benzothiazole or naphthothiazole salts, there can be prepared simple cyanine dyes other than pseudocyanine dyes.

To prepare unsymmetrical carbocyanine dyes from (2,1d)indenothiazole or 2-methyl-(2,1d)indenothiazole quaternary salts, they are reacted with cycloammonium quaternary salts containing a β-aryl aminovinyl group in the alpha or gamma position, i.e., in one of the so-called reactive positions in the presence of an acid binding agent, e.g., pyridine or pyridine and triethylamine.

To prepare styryl dyes from the new quaternary salts of this invention, they are condensed with p-dialkyl aminobenzaldehyde in the presence of an alkaline catalyst such as piperidine in absolute ethanol solution.

To prepare merocarbocyanine dyes from (2,1d)indenothiazole or 2-methyl-(2,1d)indenothiazole quaternary salts, they are condensed with ketomethylene heterocyclic intermediates containing an aryl aminomethylene group in the 5-position in the presence of an acid binding agent, e.g., pyridine plus triethylamine. Examples of such ketomethylene intermediates are 5-acetanilidomethylene-3-ethyl rhodanine, 5-acetanidomethylene-3-ethyl-1-phenyl-2-thiohydantoin, etc.

To sensitize photographic silver halide emulsions with the aforesaid dyes, they are dispersed in the emulsions such as the conventional gelatino-silver halide, e.g., gelatino-silver bromide, bromoiodide, chloride and chlorobromide. The methods of incorporating these dyes in the emulsions are simple and well known to those skilled in the art, and described in various patents and publications. A typical method, for example, is the one described in U.S. Patent 2,336,843, patented December 14, 1943.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. The new compound 2-methyl-(2,1d)indenothiazole having the structure

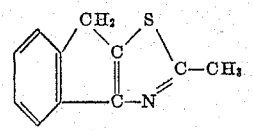

2. The new compound consisting of a quaternary salt having the following general formula:

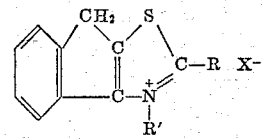

where R represents a member selected from the group consisting of hydrogen and a methyl group, R' represents a member selected from the group consisting of alkyl and aralkyl groups and X⁻ represents an anion.

3. The new compound (2,1d) indenothiazole ethiodide having the structure

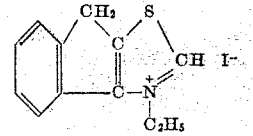

4. The new compound 2-methyl-(2,1d)indenothiazole methiodide having the structure

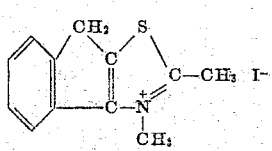

5. The new compound 2-methyl(2,1d)indenothiazole ethiodide.

6. The new compound 2-methyl-(2,1d)indenothiazole ethoperchlorate.

References Cited in the file of this patent

UNITED STATES PATENTS

| | | |
|---|---|---|
| 2,743,272 | Knott | Apr. 24, 1956 |
| 2,825,731 | White | Mar. 4, 1958 |

FOREIGN PATENTS

| | | |
|---|---|---|
| 824,519 | France | Nov. 10, 1937 |

OTHER REFERENCES

Chem Abstracts, Index to vol. 45 p. 11894 (December 1951).